United States Patent Office 3,288,213
Patented Nov. 29, 1966

3,288,213
SURFACTANT-WATER FLOODING PROCESS
Jack A. King, Tulsa, and John W. McGhee, Mannford, Okla., assignors to Cities Service Oil Company, a corporation of Delaware
No Drawing. Filed May 28, 1964, Ser. No. 371,110
9 Claims. (Cl. 166—9)

This invention relates to the use of surfactants in water flooding to increase the secondary recovery of crude oil from an oil-bearing formation. More particularly, it relates to the use of the surfactant blend resulting in maximum oil recovery for any desired surfactant-water flood system.

Oil, as it exists in subterranean reservoir rock, can be only partially recovered by conventional means. Primary oil production refers to the recovery of crude oil by means of the energy supplied by the reservoir, such as gas pressure. Oil remaining in the formation after primary energy sources have been depleted is partially recoverable by secondary measures, such as water flooding. However, considerable quantities of crude oil remain in the formation after secondary recovery, and more efficient methods must be devised to obtain further reductions in the residual oil saturation.

It has been found that the efficiency of the water flooding methods may be increased by the introduction of surfactants into the flood water. It is believed that the surfactants aid in the recovery of residual oil by promoting the wettability of the formation surfaces by water and by decreasing the interfacial tension between the oil and water phases. The use of surfactants in water flooding is shown, for example, in U.S. patents to Garst, No. 2,800,962; Sayre, Jr., No. 2,812,817 and Bernard, No. 3,056,452.

While the use of surfactants in water flooding has resulted in increased oil recovery, the prior art methods have not been found to be entirely consistent or satisfactory. It had previously been assumed, by many workers in the field that a surfactant which will increase the recovery of oil from one formation will be equally satisfactory in recovering oil from other formations. It has now been found that, in order to achieve maximum recovery of residual oil by means of water flooding, the characteristics of the surfactants employed must correspond to the particular characteristics of the crude oil found in the formation. The surfactant or surfactant blend must, in short, be tailor-made for the particular crude oil if maximum recovery is to be obtained by surfactant water flooding.

It is an object of this invention to provide a method of surfactant water flooding in which the surfactant or blend of surfactants employed is such that maximum recovery of the residual oil in the reservoir for the given surfactant system is obtained.

It is a further object of this invention to provide a water flooding method in which the surfactant or surfactant blend employed will have a characteristic corresponding to the requirements of the particular crude oil being recovered so that maximum recovery of residual oil is achieved.

The objects of this invention are accomplished by selecting a surfactant or blending a mixture of two or more surfactants so that the hydrophilic-lipophilic balance of the surfactant system is approximately the same as that associated with the crude oil-injection water system. The hydrophilic-lipophilic balance is a balance of the size and strength of the hydrophilic, or water-loving, or polar groups, and the lipophilic, or oil-loving, or non polar groups, in a surfactant system.

By the expression "hydrophilic-lipophilic balance associated with the crude oil-injection water system," as used herein, is meant the hydrophilic-lipophilic balance of the particular blend of a selected standard surfactant mixture that produces the greatest amount of additional recovery of the crude oil in question when employed together with the desired driving fluid.

When any other surfactant system is employed in place of the mixture used as a standard, the desired surfactants are employed in such proportions that the hydrophilic-lipophilic balance of the surfactant blend is the same as the hydrophilic-lipophilic balance associated with the crude oil-injection water system. This blend will result in the maximum increase in crude oil recovery obtainable for that particular surfactant system. If no substantial improvement in oil recovery is obtained when using the blend giving the required hydrophilic-lipophilic balance, further consideration of this surfactant system is unnecessary since all other blends thereof, resulting in a different hydrophilic-lipophilic balance, will not achieve a greater oil recovery than that obtained when using the blend having the required balance. Therefore, the selection of the proper blend of any given surfactant mixture from among the innumerable possible blends is greatly facilitated.

Various methods have been proposed in the literature for measuring hydrophilic-lipophilic balance. Among these are the HLB number, water number, cloud point, number of ethylene oxide units and molecular weight. The HLB system is an empirical system of classifying emulsifiers developed by the Atlas Chemical Industries, Inc. The HLB number, which is an expression of hydrophilic-lipophilic balance, represents the extent to which a surfactant will tend to act as an oil-soluble or as a water-soluble type of surfactant. A low HLB, e.g. 1–9, tends to indicate an oil-soluble substance, while a high HLB, e.g. 11–20, tends to indicate a water-soluble substance.

The HLB system has been an extremely useful empirical tool in selecting the optimum ratio of emulsifiers which, when used with a specific oil, will produce an emulsion of maximum stability for the emulsifiers being considered. It has now been determined that the HLB system provides a convenient means for selecting the proper surfactant or mixture of surfactants having a hydrophilic-lipophilic balance equal to that associated with the crude oil-injection water system, thereby resulting in maximum recovery of residual oil for that surfactant system.

As disclosed by Becher in "Emulsions, Theory, and Practice," Rheinhold Publishing Corporation, N.Y. (1957), pages 189–199, the HLB of a surfactant may be calculated as follows:

$$\mathrm{HLB} = \frac{E+P}{5}$$

where E represents the weigh percent oxyethylene content and P represents the weight percent polyhydric alcohol content.

The HLB number of a mixture of surfactants is calculated simply from the weight percent and the HLB number of each component of the mixture.

The relationship of the various means for expressing hydrophilic-lipophilic balance has been shown in the literature. For example, Becher, supra, at page 197, shows the relationship of water numbers to HLB. Likewise, Davies et al., "Interfacial Phenomena," Academic Press, New York and London (1961), pages 372–383, discuss the relationship of HLB to cloud point and to molecular weight.

While the hydrophilic-lipophilic balance associated with a given crude oil-injection water system represents the hydrophilic-lipophilic balance resulting in maximum oil recovery for any given surfactant system, it does not indicate the chemical class of surfactants that will be most effective and that will produce the greatest amount of additional oil from the reservoir. Surfactants or surfactant mixtures having the proper hydrophilic-lipophilic balance, but differing structures, must be employed to determine the chemical structure or combinations of structures resulting in the greatest recovery of residual oil. In addition, alterations such as increasing the length of an ethylene oxide chain, or varying the structure of the lipophilic unit, could conceivably so alter an ineffective surfactant mixture so as to make it effective for the desired crude oil-injection water system. Under any particular set of conditions, however, the surfactant blend having a hydrophilic-lipophilic balance equal to that associated with the crude oil-injection water system will produce the maximum increase in oil recovery obtainable with that surfactant system.

It is within the purview of the present invention to employ any of the numerous commercially available surfactants on the market. The characteristics of the crude oil-injection water system will determine the type of surfactant system and the chemical class to be employed at the required hydrophilic-lipophilic balance. The surfactants may be of the anionic, cationic, or nonionic type, or any mixture thereof, with anionic and nonionic types being preferred due to the generally higher costs of cationic surfactants. Surfactants of the various types are listed by Schwartz and Perry in "Surface Active Agents," published by Interscience Publishers, Inc. (1949).

Examples of anionic surfactants that have been employed in the practice of this invention are the petroleum sulfonates of the Bryton series sold by Bryton Chemical Company. Included in this series are Bryton F, molecular weight (M.W.) 467; Bryton Sheroscope F–430, M.W. 430; and Bryton T, M.W. 500. Other anionic surfactants are the petroleum sulfonates of the Promor series of Socony Mobil Oil Company, such as SS–6, M.W. 380; and SS–20, M.W. 415–30.

Examples of nonionic surfactants are the ethoxylated fatty amines of the Ethomeen series of Armour and Company. Included in this series are T–12, M.W. 365; T–15, M.W. 497; T–25, M.W. 937; and S–20, M.W. 719.

Other nonionic surfactants used in this invention include the Span, Tween and Brij products of Atlas Powder Company. The Span products are sorbitan fatty acid esters, while the Tween products are ethoxylated sorbitan fatty acid esters. Examples include the monolaurate, Span 20 and Tween 20; the monopalmitate, Span 40 and Tween 40; the monostearate, Span 60 and Tween 60; the monooleate, Span 80 and Tween 80; and the trioleate, Span 85 and Tween 85. The Brij products are ethoxylated fatty alcohols such as Brij 35, a polyoxyethylene lauryl ether.

The surfactant slug that is injected into the reservoir in accordance with this invention may be either water-soluble or oil-soluble, or a mixture thereof, depending upon the hydrophilic-lipophilic balance associated iwth the crude oil-injection water system. The use of oil-soluble surfactants has not heretofore been considered desirable for recovery of additional residual crude oil in water flooding, although they have been used to remove connate water that blocks the flow of oil toward the production wells during primary production.

Oil-soluble surfactants may be injected into the reservoir dissolved in a slug of oil or suspended in a slug of water. Water-soluble surfactants are normally injected into the reservoir in water solution. The surfactant slug may be injected initially at the commencement of water flooding operations or may be added to a reservoir previously water flooded.

The volume and concentration of the surfactant slug is selected so as to obtain an economic balance between the amount of surfactant used and the amount of additional crude oil recovered from the reservoir. It has been found that a volume of surfactant slug not exceeding 10 percent of the poer space of the core is generally sufficient with about 5 percent being preferred. The concentration of surfactants in the slug generally range from about 2 percent to about 10 percent by weight, with about 4 percent being preferred.

Many commercially available surfactants actually consist of a mixture or related products. Any such commercially available surfactant is treated for purposes of this invention, as a single surfactant rather than as a mixture. By mixing two or more of such single surfactants, a blend having the required hydrophilic-lipophilic balance may be obtained, whereas any single surfactant is unlikely to have the required hydrophilic-lipophilic balance, although some surfactants will have a balance fairly close to that associated with the particular crude oil-injection water system.

It should be noted that, in some instances, a crude oil-injection water system may have more than one hydrophilic-lipophilic balance at which maximum recovery is obtained. For example, there may be one balance in the hydrophilic range and another in the lipophilic range. In this case, the desired surfactant mixture may be blended so as to obtain a hydrophilic-lipophilic balance equal to either of those associated with the crude oil-injection water system.

The following examples will serve to illustrate the practice of the present invention.

EXAMPLE I

The HLB associated with a Rodney crude oil taken from the Rodney Pool, Gillies No. 17, Ontario, Canada, and a 5 percent NaCl driving fluid was determined by the following procedure. Two 3-inch long, one inch sandstone cores from the Bluejacket sand were placed end-to-end, in a Hassler cell, a standard core holding device. The annulus was pressurized to prevent fluid bypassing. The core was first fully saturated with 5 percent NaCl and was then flooded with the Rodney crude oil. A 5 percent NaCl drive was then made to recover all of the crude oil movable by normal water flooding. At this point, a slug of surfactant solution was injected into the core and was driven by a 5 percent NaCl solution. The volume of the surfactant flood was approximately 4.3 percent of the pore space of the core, and the concentration of surfactants in the slug was approximately 10 percent by weight. Additional oil recovered above the amount of oil in the slug, if any, was taken as increased oil production due to the influence of the injected surfactants. The results obtained when using a mixture of Span 80 and Tween 80 are tabulated in Table I.

Table I.—*Atlas Span 80-Tween 80 Series*

[Bluejacket cores—Rodney crude oil; Driving phase—5% NaCl]

| HLB: | Increased oil production (percent pore space) |
|---|---|
| 8.5 | 2.7 |
| 9.0 | 4.1 |
| 9.5 | 6.7 |
| 10.0 | 3.5 |
| 10.5 | 1.1 |

Thus an optimum HLB value appears to be approximately 9.5 at which 6.7 percent additional pore space of crude oil was produced.

Following the same procedure, a series of runs was made with Rodney crude oil and the oil-soluble petroleum sulfonates, Promor SS–6 and Bryton T. These surfactants were mixed so as to produce blends of various average molecular weight. In this manner the linear relation of HLB and the number of CH or $CH_2$ groups in the lipophilic chain was demonstrated. The results are tabulated in Table II.

*Table II.—Promor SS-6 and Bryton T*

[Bluejacket cores—Rodney crude oil; Driving phase—5% NaCl]

| Average molecular weight: | Increased oil production (percent pore space) |
|---|---|
| 413 | 3.4 |
| 430 | 4.1 |
| 450 | 7.8 |
| 466 | 7.0 |
| 476 | 6.7 |
| 492 | 5.2 |

EXAMPLE II

A sample of crude oil taken from the 650 foot sand, El Dorado (Kansas) field was used in a series of runs according to the procedure described above, employing distilled water as the driving force. The HLB associated with the crude oil-injection water system was determined by a series of runs employing the Span 80-Tween 80 system. Maximum oil production, approximately 3.2% pore space, was obtained at an HLB of approximately 6.0. Additional runs were made in which the chemical class of surfactants was varied, maintaining the HLB of the blend at 6.0. The best oil production, i.e. an average of approximately 9.8% pore volume, was obtained with a blend of Brij-35 and Span 80. A blend of Span 80 and Tween 20, on the other hand, produced only 1.4% pore volume additional oil recovery.

It will be understood that various changes in the details that have been herein described in order to explain the nature of this invention may be made by those skilled in the art within the principle and scope of the invention as expressed in the appended claims.

Therefore, we claim:

1. A method for recovering oil from subterranean reservoirs by surfactant waterflood injection in which the additional oil recoverable by any given surfactant system is maximized comprising:
    (a) Injecting a surfactant slug not exceeding about 10% of the formation pore volume into the reservoir, said slug containing not more than about 10% by weight surfactants, the surfactants being blended in such proportions that the hydrophilic-lipophilic balance of the surfactant system is approximately the same as that associated with the crude oil-injection water system; and
    (b) Driving the surfactant slug through the reservoir by means of a water flood,
whereby, a portion of the residual oil retained in the reservoir after primary production will be recovered, said portion being greater than that recoverable by blending the desired surfactants in any other proportions.

2. The method of claim 1 in which at least one of the surfactants employed is oil soluble.

3. The method of claim 1 in which at least one of the surfactants employed is water soluble.

4. The method of claim 1 in which at least one of the surfactants is anionic.

5. The method of claim 1 in which at least one of the surfactants is nonionic.

6. The method of claim 1 in which the surfactant system comprises a binary mixture of surfactants.

7. The method of claim 1 in which the surfactant system comprises a mixture of more than two surfactants.

8. The method of claim 1 in which the hydrophilic-lipophilic balance of the surfactant system and that associated with the crude oil-injection water system are determined from the HLB numbers of the surfactants employed.

9. The method of claim 1 in which the hydrophilic-lipophilic balance of the surfactant system and that associated with the crude oil-injection water system are determined from the water numbers of the surfactants employed.

References Cited by the Examiner

UNITED STATES PATENTS

| | | | |
|---|---|---|---|
| 2,800,962 | 7/1957 | Garst | 166—9 |
| 2,812,817 | 11/1957 | Sayre | 166—9 |
| 3,056,452 | 10/1962 | Bernard et al. | 166—9 X |
| 3,096,820 | 7/1963 | Bernard | 166—9 |

OTHER REFERENCES

Becher, Emulsions, Theory and Practice, Second Edition, Rheinhold Publishing Co., New York (1965) (pp. 232 to 234 and 247 to 255).

Davies, J. T., et al., Interfacial Phenomena, Academic Press, New York (1961) (pp. 372–383).

CHARLES E. O'CONNELL, *Primary Examiner*

S. J. NOVOSAD, *Assistant Examiner.*